United States Patent [19]

Melinat

[11] 4,375,842
[45] Mar. 8, 1983

[54] DISC BRAKE CALIPER PISTON AND HOUSING RETRACTION AND KNOCKBACK CONTROL MECHANISM

[75] Inventor: Wolfgang Melinat, Dayton, Ohio

[73] Assignee: General Motors Corporation, Detroit, Mich.

[21] Appl. No.: 277,151

[22] Filed: Jun. 25, 1981

[51] Int. Cl.³ .................... F16D 55/224; F16D 65/54
[52] U.S. Cl. .................. 188/71.8; 188/72.3; 188/196 P
[58] Field of Search ............ 188/71.7, 71.8, 72.3, 188/72.4, 79.5 GE, 196 P

[56] References Cited

U.S. PATENT DOCUMENTS

| | | | |
|---|---|---|---|
| 2,948,356 | 8/1960 | Butler | 188/72.3 |
| 3,255,846 | 6/1966 | Livezey | 188/72.4 |
| 3,277,983 | 10/1966 | Jeffries | 188/72.3 |
| 3,377,076 | 4/1968 | Burnett | 188/196 P |
| 3,417,843 | 12/1968 | Trollope | 188/72.3 |
| 3,495,689 | 2/1970 | Peach | 188/196 P |
| 3,618,714 | 11/1971 | Crosswell | 188/71.8 |
| 4,345,674 | 8/1982 | Vacval | 188/71.8 |

FOREIGN PATENT DOCUMENTS 1425184 10/1968 Fed. Rep. of Germany ... 188/196 P

Primary Examiner—Douglas C. Butler
Assistant Examiner—R. R. Diefendorf
Attorney, Agent, or Firm—D. D. McGraw

[57] ABSTRACT

The mechanism provides a disc brake assembly with zero drag when released. It controls the retractive movements of the caliper housing and the actuating piston, relying on predetermined dimensional and mechanical properties for functional repeatability. It uses friction rings and spring washers.

3 Claims, 5 Drawing Figures

DISC BRAKE CALIPER PISTON AND HOUSING RETRACTION AND KNOCKBACK CONTROL MECHANISM

The invention relates to a mechanism for actively controlling caliper piston and housing retraction and knockback in a predetermined manner.

Sliding disc brake calipers are usually so constructed and arranged that the friction surfaces of the brake linings are either in light continuous contact with the rubbing surfaces of the disc when the brakes are released, or have brake lining drag reduced or eliminated in a somewhat passive and unpredictable manner by using a laterally free-floating caliper and relying on disc runout as well as caliper knockback forces to disengage the brake linings from the disc. Some calipers use a deformable piston seal arrangement to provide for a small amount of piston retraction while relying upon disc runout to move the caliper housing sufficiently to disengage the outboard lining from the disc.

It is desirable to minimize caliper and master cylinder fluid displacement requirements so as to reduce lost pedal travel and to obtain braking effort at the beginning of each brake apply with a minimum time delay. In calipers having a continuous rubbing action of the linings on the disc, small amounts of braking torque are generated while the brakes are released, having the effect of reducing fuel economy since additional engine power is required at any particular vehicle speed.

The invention herein disclosed and claimed eliminates brake lining drag, also commonly referred to as caliper drag, by disengaging the inboard and outboard linings from the disc surfaces using mechanical mechanisms in a predetermined, active mode. The preferred embodiment uses retraction knockback and control mechanisms for the piston relative to the caliper housing and for the caliper housing relative to a fixed mounting member.

The mechanism embodying the invention provides for a specific limited amount of caliper and piston knockback, includes an arrangement wherein the caliper and the piston are repositioned after actuation or knockback into a drag-free running position for each of the brake pad assemblies, and relies upon predetermined dimensional and mechanical properties for functional repeatability.

IN THE DRAWING

Figure 1:
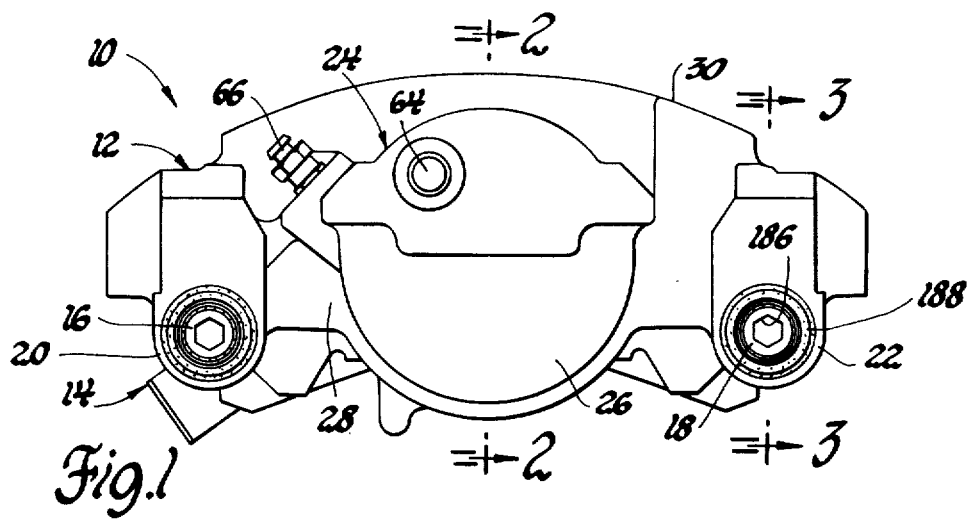
FIG. 1 is an elevation view of a disc brake assembly embodying the invention.

The disc brake assembly 10 includes a caliper 12 and a fixed mounting member 14. The mounting member 14 is suitably secured to a rotatably fixed portion of the vehicle, such as a steering knuckle, on the inboard side of the wheel to be braked. The caliper 12 is mounted for sliding movement thereon by a pair of bolts 16 and 18 respectively extending through mounting bolt bosses 20 and 22 formed as a part of the caliper housing 24.

The caliper 12 includes a cylinder housing section 26 formed as a part of the caliper inboard leg 28. The mounting bolt bosses 20 and 22 are also parts of the inboard leg 28. The caliper bridge section 30 is illustrated as being formed with a center opening 32. The bridge section extends over the outer periphery 34 of the disc 36 to be braked. Disc 36 is suitably secured to and rotates with a vehicle wheel, not shown, so that when the disc is braked the wheel is also braked. The caliper 12 has an outboard leg 38 illustrated as having two portions extending along the outer braking surface 40 of disc 36 generally parallel to the inboard leg 28, which extends along the inner braking surface 42 of disc 36. The outboard brake pad assembly 44 is suitably mounted on the outboard leg 38 so that its backing plate 46 is engaged by the outboard leg sections and its friction lining 48 is so positioned that the lining friction surface 50 is engageable with the disc outer braking surface 40 when the brake is actuated. When the brake is in the released position illustrated in FIG. 2 it is desirable to have a preset required minimum gap running clearance $C_o$ between the friction surface 50 and the braking surface 40. The gap $C_o$ illustrated is exaggerated in FIG. 2 for clarity and may be on the order of 0.015 inches.

A cylinder 52 is formed in the cylinder housing section 26 so that it opens toward disc 36. Piston 54 is reciprocably received within cylinder 52 so that it is movable by hydraulic pressure exerted in pressurizing chamber 56. That chamber is defined by the end wall 58 of cylinder 52, piston end wall 60, and a portion of the cylinder side wall 62. A suitable hydraulic pressure inlet 64 is provided for the introduction of hydraulic pressure into chamber 56 and the release of that pressure under the control of the brake operator. A suitable bleed valve 66 is also provided for chamber 56 to assist in bleeding the vehicle brakes in the usual manner.

The outer end 68 of piston 54 engages one side of the backing plate 70 of the inboard brake pad assembly 72. The friction lining 74 of inboard brake pad assembly 72 is mounted on the other side of the backing plate 70 so that its friction surface 76 is engageable with the disc inner braking surface 42 when the brake is actuated. When the brake is in the released position illustrated in FIG. 2 it is desirable that a preset required minimum gap running clearance $C_i$ be maintained between the disc inner braking surface 42 and the friction surface 76 of the inboard brake pad assembly 72. The minimum gap running clearance $C_i$ is exaggerated in FIG. 2 for clarity and may be on the order of 0.015 inches.

The inboard brake pad assembly 72 is retained on piston 54 by means of an anti-rattle and shoe retention spring 78 which is suitably secured to the back side of backing plate 70 and is clipped within a suitable recess 80 formed in the end 68 of piston 54. An annular flexible boot 82 has its outer periphery secured within a diametrically enlarged portion 84 of cylinder 52 so that the boot inner periphery 86 is retained within a recess formed on the outer surface of the piston 54 adjacent the piston end 68.

Figure 4:
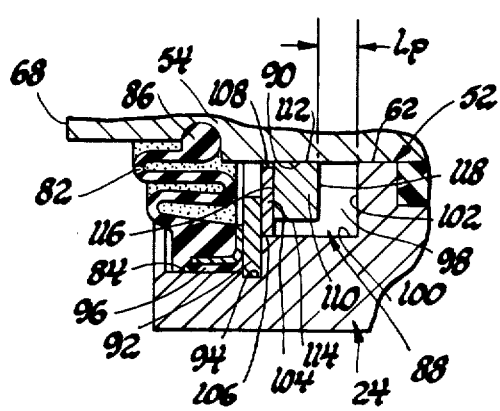
FIG. 4 is an enlarged fragmentary cross section view having parts broken away and showing a sectional part of the piston retraction and knockback control mechanism illustrated in FIG. 2.

The piston retraction and knockback control mechanism 88 has a sectional portion shown in enlarged detail in FIG. 4. Mechanism 88 is provided within cylinder 52 and on the outer surface 90 of piston 54, which is slidably movable within cylinder 52 as the piston is moved. The mechanism 88 includes a snap ring type retainer 92 received within a groove 94 formed in cylinder 52 immediately adjacent the diametrically enlarged portion 84 receiving the outer periphery 96 of boot 82. A recess 98 is formed within cylinder 52 adjacent retainer groove 94 so that the inner peripheral portion of the retainer 92 closes the outer peripheral portion of recess 98. Recess 98 has an outer diameter wall 100, and an end wall 102 spaced axially from retainer 92 and extending radially inward to the surface of cylinder side wall 62.

Figure 2:
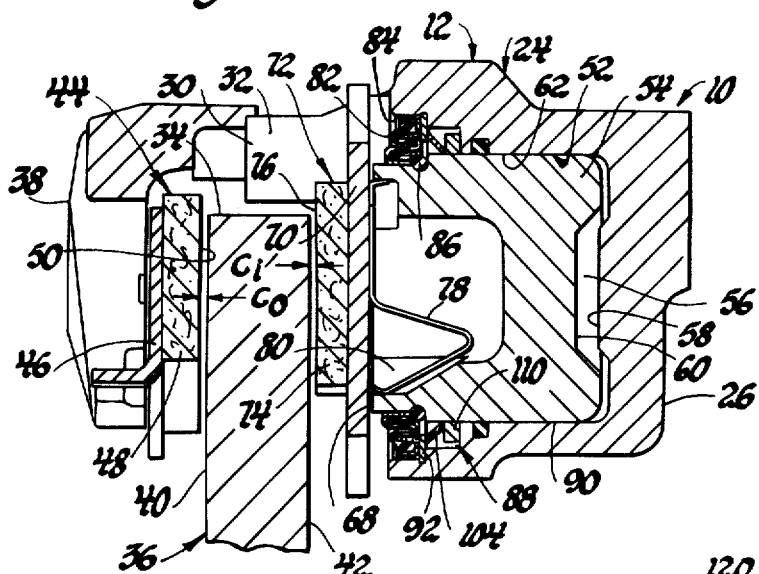
FIG. 2 is a cross section view of the assembly of FIG. 1 taken in the direction of arrows 2—2 of that Figure and having parts broken away.

A spring washer 104 is positioned within recess 98 so that its outer periphery 106 is immediately adjacent or engages the wall 100 of recess 98 and engages the one side of retainer 92. The inner periphery 108 of spring washer 104, which may be formed by suitable spring fingers, extends radially inwardly from the outer periphery 106 and axially toward the cylinder end wall 58 when the spring washer is in the substantially unbiased position. The spring washer 104 is generally frusto-conical in section when not fully biased, as illustrated in FIG. 2. The radial width of spring washer 104 between its outer periphery 106 and its inner periphery 108 is somewhat less than the radial depth of recess 98 from the recess outer wall 100 to the surface of cylinder side wall 62 so that the spring washer 104 may be readily fully biased without interference to the flat position shown in FIG. 4.

A friction ring 110 is received within recess 98 axially between spring washer 104 and recess end wall 102. The friction ring inner surface 112 exerts a predetermined clamping force on the piston outer surface 90 so that the friction ring resists axial movement relative to the piston, but may be moved axially relative to the piston when a predetermined axial force is exerted thereon. The friction ring 110 has its outer surface 114 positioned radially inward of recess wall 100. One side surface 116 of friction ring 110 engages a mating side surface of spring washer 104 to establish a limit of relative movement between the friction ring 110 and the caliper housing 24. The other side surface 118 of friction ring 110 is so positioned relative to recess end wall 102 as to be engaged with that end wall when the brake is in the released position shown in FIG. 2. Friction ring 110 is held in this position by the force of spring washer 104 acting on the friction ring. This acts to hold piston 54 and brake pad assembly 72 in the released position shown in FIG. 2.

When the maximum amount of friction ring travel relative to the caliper housing 24 is obtained upon brake actuation, the axial clearance $L_p$ between recess end wall 102 and the friction ring other side surface 118 establishes the predetermined limited amount of axial retractive movement $L_p$ of the piston 54 relative to the caliper housing 24 during piston and brake pad assembly retraction. The friction ring 110 operates as a grip-and-slip mechanism so that when piston 54 is moved by pressure in chamber 56 for an axial distance greater than the limited amount of movement $L_p$, spring washer 104 is fully biased to the position shown in FIG. 4 and friction ring 110 can move no further relative to caliper housing 24 so that it slips relative to the piston surface 90. Thus the friction ring 110 establishes a new clamping position on piston 54. When the hydraulic pressure in chamber 56 is released, the biasing force of spring washer 104 acts on friction ring 110 to move that ring, piston 54 and brake pad assembly 72 concurrently toward cylinder end wall 58 until the friction ring surface 118 engages the recess end wall 102. This limits the amount of retraction of piston 54 and therefore of inboard brake pad assembly 72 to the distance $L_p$.

The caliper housing retraction and knockback control mechanism 120 is provided within each mounting bolt boss 20 and 22. Since the mechanisms within the mounting bolt bosses are substantially identical, only the mechanism contained within boss 22 will be further described. It will be understood that the mechanism of boss 20 is constructed and operates in the same manner.

Boss 22 has a bore 122 extending therethrough axially parallel to the axis of disc 36. The inboard end 124 of bore 122 is provided with stepped recesses 126 and 128 separated by shoulder 130, with recess 128 being separated from the smallest bore diameter portion 132 by a shoulder 134. The outboard end 136 of bore 122 is similarly constructed with stepped recesses 138 and 140 and shoulders 142 and 144. A groove 146 is formed in recess 138 immediately adjacent shoulder 142. Groove 146 receives a snap ring type retainer 148 so that the inner peripheral portion of the retainer closes the outer peripheral portion of recess 140. Recess 140 has an outer diameter wall 150, and shoulder 144 forms an end wall of the recess which is spaced axially from retainer 148. A cylindrical bushing 152 is received within the smallest bore diameter portion 132 and has a small end flange 154 fitting within a recess 156 formed through the inner peripheral portion of shoulder 144 so that the outer end surface 158 of the bushing is aligned with the surface of shoulder 144. Bushing 152 may have axially extending grooves 160 formed on its inner surface to provide lubrication grooves for very low sliding friction. The bushing may be made of a low friction material such as Teflon.

Figure 3:
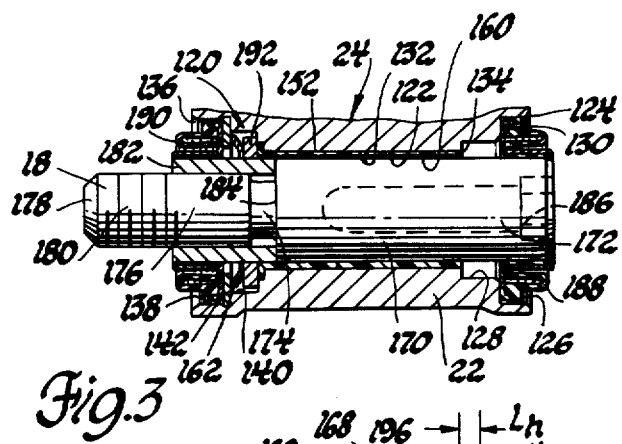
FIG. 3 is a cross section view of another part of the assembly of FIG. 1 taken in the direction of arrows 3—3 of that Figure and having parts broken away.

A spring washer 162 is positioned within recess 140 so that its outer periphery 164 is immediately adjacent or engages the outer diameter wall 150 of recess 140 and engages the side 166 of retainer 148 which faces recess 140. The inner periphery 168 of spring washer 162, which may be formed by suitable spring fingers, extends radially inwardly from the outer periphery 164 and axially toward shoulder 144 when the spring washer is in the substantially unbiased position. The spring washer 162 is generally frustoconical in section when not fully biased, as illustrated in FIG. 3. The radial width of spring washer 162 between its outer periphery 164 and its inner periphery 168 is somewhat less than the radial depth of recess 140 so that the spring washer 162 may be readily fully biased without interference to the flat position shown in FIG. 5.

The mounting bolt 18 has a body section 170 of constant diameter extending from the bolt head 172 to a relief groove 174, and has a smaller diameter body section 176 on the outer end 178 on which suitable threads 180 are formed. A bolt sleeve 182 is fitted over the smaller diameter body section 176 and engages the shoulder 184 formed by one side of groove 174. Sleeve 182 has the same outer diameter as does bolt body section 170, and its inner diameter covers the relief groove 174. The bolt head 172 has a recessed socket 186 for receiving a suitable driving tool. When assembling the caliper 12 on the fixed mounting member 14, the bolt and the bolt sleeve are inserted through bore 122 and the threads 180 are threaded into an opening, not shown, formed in the fixed mounting member 14. The bolt is tightened, the bolt sleeve 182 bottoming against the fixed mounting member and the relief groove 174 allowing sufficient stretch of the bolt to tightly secure the bolt to the fixed mounting member.

The inner surface of bushing 152 receives the major portion of the bolt body section 170 and a part of the bolt sleeve 182, the bolt head 172 being positioned at the inner end 124 of bore 122 and the bolt sleeve 182 being positioned at the outboard end 136 of bore 122. Once assembled, the bolt 18 and the bolt sleeve 182 are operative as fixed portions of the fixed mounting member 14 and provide sliding guided support for the caliper 12. A boot 188 has its outer periphery fitted within recess 126 and its inner periphery fitted to the head 172 of bolt 18. Another boot 190 has its outer periphery fitted within recess 138 and its inner periphery fitted to the bolt sleeve 182. The boots contain any lubricant provided for easy sliding of the caliper housing on the bolt and prevent contamination of the mechanism contained within the bore 122.

A friction ring 192 is received within recess 140 axially between spring washer 162 and recess shoulder 144. The friction ring inner surface 194 exerts a predetermined clamping force on the bolt sleeve outer surface 196 so that the friction ring resists axial movement relative to the bolt sleeve, the bolt 18 and the fixed mounting member 14. However, the friction ring may be moved axially relative to the bolt sleeve when a predetermined axial force is exerted thereon. The friction ring 192 has its outer surface 198 positioned radially inward of recess wall 150. One side surface 200 of friction ring 192 engages a mating side surface 202 of spring washer 162 to establish a limit of relative movement between the friction ring 192 and the bolt sleeve 182. The other side surface 204 of friction ring 192 is so positioned relative to recess shoulder 144 as to be engaged with that shoulder when the brake is in released position shown in FIG. 3. Friction ring 192 is held in this position by the force of spring washer 162 acting on the friction ring. This acts to hold caliper housing 24, caliper 12 and brake pad assembly 44 in released position shown in FIGS. 2 and 3.

Figure 5:
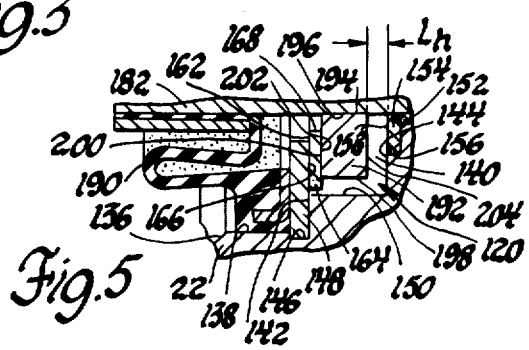
FIG. 5 is an enlarged fragmentary cross section view having parts broken away and showing a sectional part of the caliper housing retraction and knockback control mechanism illustrated in FIG. 3.

When the maximum amount of friction ring travel relative to bolt sleeve 182 is obtained upon brake actuation, the axial clearance $L_h$ between recess shoulder 144 and the friction ring side surface 204 establishes the predetermined limited amount of retractive movement $L_h$ of the caliper housing relative to the fixed mounting member 14 during caliper housing retraction. The friction ring 192 operates as a grip-and-slip mechanism so that when the caliper housing 24 is moved by pressure in chamber 56 rightwardly as viewed in FIG. 2, and leftwardly as viewed in FIGS. 3 and 5, for an axial distance greater than the limited amount of movement $L_h$, spring washer 162 is fully biased to the position shown in FIG. 5 and friction ring 192 can move no further relative to bolt sleeve 182 so that it slips relative to the bolt sleeve. Thus the friction ring 192 establishes a new clamping position on bolt sleeve 182. When the hydraulic pressure in chamber 56 is released, the biasing force of spring washer 162 acts on the friction ring 192 to move that ring, caliper 12 and outboard brake pad assembly 44 concurrently leftwardly as seen in FIG. 2, and rightwardly as seen in FIGS. 3 and 5, until the friction ring surface 204 engages recess shoulder 144. This limits the amount of retraction movement of caliper 12, and therefore the amount of retraction movement of outboard brake pad assembly 44, to the distance $L_h$.

There are several characteristics and functions of the disc brake assembly which are considered in establishing the maximum retraction travel dimensions $L_p$ and $L_h$. Considerations include caliper mounting angularities, caliper housing deflections under full hydraulic pressure actuation, shoe deflections under full hydraulic pressure actuation, friction lining and piston compression under full hydraulic pressure actuation, disc runout, required lining-to-disc running clearances, and temperature influences.

In establishing the necessary retraction travels to assure zero brake drag, the following symbols and definitions are useful:

$C_o$ = Predetermined clearance, between the friction surface 50 of the outboard lining 48 and the outboard braking surface 40 of the disc 36 when the brake is released, to assure zero brake drag.

$C_i$ = Predetermined clearance, between the friction surface 76 of the inboard lining 74 and the inboard braking surface 42 of the disc 36 when the brake is released, to assure zero brake drag.

$d_o$ = Caliper housing deflection, measured at the outboard brake pad face 50 when the brake is subjected to the design maximum brake actuating pressure. It will include causes other than the deflection due to bending of the caliper bridge and spreading of the outboard leg, such as lining compression, disc runout, and temperature influences. The net effect is shown in outward movement of the outboard caliper leg (leftward as seen in FIG. 2) relative to the center of the caliper bridge section.

$T_h$ = Caliper housing 24 retraction travel required to establish clearance $C_o$ from the brake applied position. This is leftward movement of housing 24 as seen in FIG. 2, and is measured by movement at the mounting bolt bosses 20 and 22 relative to mounting bolt pins 16 and 18.

$$T_h = C_o + d_o.$$

$T_p$ = Piston 54 retraction travel within cylinder 52 required to establish clearance $C_i$ from the brake applied position. This is rightward movement of piston 54 as seen in FIG. 2, and is measured by movement of piston 54 relative to the cylinder housing section 26.

$L_h$ = The maximum amount of caliper housing 24 travel $T_h$ to be permitted during brake actuation without requiring an adjustment of the caliper housing retracted position to be made. Assuming that the required brake actuation is high enough to move caliper housing 24 rightwardly from the position illustrated in FIG. 2 to the position illustrated in FIG. 5, $$L_h = T_h.$$

$L_p$ = The maximum amount of piston 54 travel relative to the cylinder housing section 26, and specifically cylinder wall 62, without requiring an adjustment of the piston retracted position to be made. Assuming that brake actuation moves piston 54 leftwardly from the position illustrated in FIG. 2 to the position illustrated in FIG. 4, $$L_p = T_p,$$

$$T_p = 2T_h, \text{ and}$$

$$T_p + T_h = 3T_h,$$

therefore when $L_h = T_h,$
$L_p = 3T_h$ to counteract the housing movements which are contrary to the piston movements.

In a typical brake installation it has been found that $L_p$ may have a value of 0.015 inches. Therefore the value of $L_h$ would be 0.045 inches. The required piston and housing travels generate additional volumetric brake fluid requirements which must be added to and provided by the master cylinder generating the brake actuating pressures.

The friction ring clamp forces and slide forces must be established so that the rings prevent housing and piston knockback under the most severe operating conditions. At the same time the rings must not be displaced on the piston or bolt sleeve by the spring washer forces. At the same time their frictional forces preventing sliding must be as low as possible commensurate with the other ring functions to minimize hydraulic pressure losses required to overcome the frictional forces and cause the rings to slide when sufficient brake lining wear requires an adjustment of the friction rings relative to the members on which they are slidingly clamped. The required spring washer forces for piston and caliper housing retraction must also be similarly considered. These forces must be sufficiently low to allow full biasing of the spring washer under full hydraulic pressure actuation without moving the friction rings relative to the members on which they are clamped, but must be sufficiently high to move the caliper housing and the piston against friction forces resisting such movement during retraction.

Upon introduction of hydraulic brake actuating pressure into chamber 56, the piston 54 moves outboard toward disc 36. The caliper housing 24, including the mounting bolt bosses 20 and 22, moves inboard by sliding on bolts 16 and 18. As a result, friction ring 110 moves through a reducing distance equal to the maximum retraction dimension $L_p$ and friction rings 192 move through a reducing distance equal to the maximum retraction dimension $L_h$. So long as the travel of the friction rings 110 and 192 do not attempt to exceed the respective maximum retractive dimensions $L_p$ and $L_h$, the friction rings remain fixedly clamped to the piston 54 and the bolt sleeves 182. If the movements of the friction rings attempt to exceed the retractive limit dimensions $L_p$ and $L_h$ during brake actuation, the friction rings bottom out against their respective spring washers, which have been biased to the flat position illustrated in FIGS. 4 and 5, and the friction rings are forcibly repositioned on the piston 54 and the bolt sleeves 182.

On hydraulic pressure release, the spring washers 104 and 162 will push the friction rings 110 and 192 back until they respectively engage end wall 102 and shoulder 144, thereby returning the piston 54 and the caliper housing 24 to positions where no forces are exerted on the inboard brake pad assembly 72 or the outboard brake pad assembly 44. Since the inboard brake pad assembly 72 is semi-permanently fixed to piston 54 by the anti-rattle and shoe retention spring 78, a predetermined running clearance $C_i$ will develop between the inboard disc surface 42 and the inboard friction lining surface 76 upon position retraction. Since the outboard brake pad assembly 44 is permanently affixed to the outboard caliper housing leg 38 by suitable shoe attachments, a predetermined running clearance $C_o$ will be established between the outboard friction lining surface 50 and the outboard disc surface 40 upon housing retraction. Thus the inboard and outboard friction lining-to-disc running clearances are actively controlled in a predetermined manner to provide a disc brake assembly having zero drag when released.

Caliper housing and/or caliper piston knockback is limited by the maximum retraction dimensions $L_p$ and $L_h$ since the frictional forces of the friction rings 110 and 192 exceed the highest possible knockback forces by design. Upon cessation of the knockback forces, spring washers 104 and 162 will reposition the caliper assembly into the drag free running condition.

The embodiments of the invention in which an exclusive property or privilege is claimed are defined as follows:

1. In a disc brake assembly having a caliper including a housing slidably mounted on a fixed mounting member, a first brake pad assembly mounted on said caliper housing and having a first friction surface positioned for engagement with one side of a disc to be braked, a hydraulically actuated piston mounted in a cylinder formed in said caliper housing, a second brake pad assembly mounted on said piston and having a second friction surface positioned for engagement with the other side of the disc to be braked, and a grip-and-slip retraction and knockback control mechanism, the improvement comprising the mechanism determining and controlling disc brake pad assembly retraction movements to establish zero drag between the brake pad assembly friction surfaces and the disc, said mechanism comprising in combination:

a caliper housing grip-and-slip retraction and knockback control mechanism providing for a predetermined limited amount of caliper housing retractive sliding movement on said fixed mounting member during brake pad assembly retraction and acting during brake actuation when said amount of predetermined limited axial caliper housing movement is exceeded in the brake actuation direction to adjust the retracted position of said caliper housing relative to said fixed mounting member;

and a piston grip-and-slip retraction and knockback control mechanism providing for a predetermined limited amount of axial retractive movement of said piston relative to said caliper housing during brake pad assembly retraction and acting during brake actuation when said amount of predetermined limited axial piston retractive movement is exceeded to adjust the retracted position of said piston relative to said caliper housing;

the predetermined limited axial retractive movement of said piston in the caliper housing upon brake release being established by the sum of the total caliper housing movement relative to the fixed mounting member at full hydraulic pressure actuation of the disc brake assembly and the total second brake pad assembly friction surface movement relative to the disc at full hydraulic pressure actuation of the disc brake assembly.

2. In a disc brake assembly having a caliper including a housing slidably mounted on a fixed mounting member, a first brake pad assembly mounted on said caliper housing and having a first friction surface positioned for engagement with one side of a disc to be braked, a hydraulically actuated piston mounted in a cylinder formed in said caliper housing, a second brake pad assembly mounted on said piston and having a second friction surface positioned for engagement with the other side of the disc to be braked, and a grip-and-slip retraction and knockback control mechanism, the improvement comprising the mechanism determining and controlling disc brake pad assembly retractive movements to establish zero drag between the brake pad assembly friction surfaces and the disc, said mechanism comprising in combination:

a caliper housing grip-and-slip retraction and knockback control mechanism providing for a predetermined limited amount of caliper housing retraction sliding movement on said fixed mounting member during brake pad assembly retraction and acting during brake actuation when said amount of predetermined limited axial caliper housing movement is exceeded in the brake actuation direction to adjust the retracted position of said caliper housing relative to said fixed mounting member;

and a piston grip-and-slip retraction and knockback control mechanism providing for a predetermined limited amount of axial retractive movement of said piston relative to said caliper housing during brake pad assembly retraction and acting during brake actuation when said amount of predetermined limited axial piston retractive movement is exceeded to adjust the retracted position of said piston relative to said caliper housing;

the predetermined limited axial retractive movement of said piston in the caliper housing upon brake release being established by the sum of the total caliper housing movement relative to the fixed mounting member at full hydraulic pressure actuation of the disc brake assembly and the total second brake pad assembly friction surface movement relative to the disc at full hydraulic pressure actuation of the disc brake assembly;

said total caliper housing movement relative to the fixed mounting member being the sum of caliper housing deflection at the first brake pad assembly friction surface when the brake is fully hydraulic pressure actuated and a preset required minimum gap running clearance between the first friction surface and the disc to be braked;

said total second friction surface movement relative to the disc to be braked being determined by the sum of the caliper housing deflection at the second brake pad friction surface when the assembly is fully hydraulic pressure actuated and a preset minimum gap running clearance between said second friction surface and the disc to be braked.

3. In a sliding caliper disc brake assembly having at least one mounting bolt and a caliper slidably mounted on said bolt, said caliper including a caliper housing having one leg defining a cylinder, a piston reciprocably received in said cylinder and adapted to be actuated by hydraulic brake pressure to actuate the brake assembly, a first brake pad assembly mounted on said piston for movement therewith, said caliper housing having another leg having a second brake pad assembly mounted thereon for movement with said caliper housing, and a caliper housing bridge section joining said legs, said assembly being arranged to cooperate with a brake disc selectively engageable and disengageable by said brake pad assemblies for brake actuation and deactuation, said mounting bolt extending in an opening in said caliper housing to permit guided axial movement of said caliper housing relative to said mounting bolt and the disc to be braked, the improvement comprising:

a disc brake caliper piston and housing retraction and knockback control arrangement assuring zero drag of the brake pad assemblies on the brake disc while the brake is not actuated, said control arrangement comprising:

a piston retraction and knockback control mechanism including an annular recess in said caliper cylinder, a friction ring in said recess extending about and frictionally gripping said piston and capable of a predetermined limited axial movement within said recess relative to said caliper housing, a spring in said recess acting on said friction ring and continually urging said piston via said friction ring toward a retracted position of brake assembly deactuation, actuating movement of said piston in the brake actuating direction in response to hydraulic fluid pressure acting thereon within said cylinder carrying said friction ring axially to compress said spring, said piston when moving an axial distance greater than the predetermined amount of limited axial movement of said friction ring in said recess slipping in said friction ring so that said friction ring grips said piston at an axially changed position, said spring expanding axially upon piston deactuation to move said friction ring with said piston to an axially changed retracted position established by the amount of movement of said piston in said friction ring, the retractive clearance of said first brake pad assembly relative to the disc being established by the predetermined limited axial movement of the friction ring in the recess;

a caliper housing retraction and knockback control mechanism including an annular recess formed in said caliper housing opening, a second friction ring in said recess extending about and frictionally gripping said mounting bolt and capable of a predetermined limited axial movement in said recess relative to said caliper housing, a second spring in said recess acting on said caliper housing and continually urging said caliper housing toward a retracted position corresponding to brake deactuation by reacting on said mounting bolt through said second friction ring, actuating movement of said caliper housing in the brake actuating direction in response to hydraulic brake fluid pressure in said cylinder acting on said piston and said housing compressing said second spring axially as said housing recess moves axially relative to said second friction ring, said housing when moving an axial distance greater than the predetermined amount of limited axial movement of said second friction ring in said recess causing said second friction ring to slip axially on said mounting bolt so that said second friction ring grips said mounting bolt at an axially changed position, said second spring expanding axially upon caliper housing deactuation to move said housing to an axially changed retracted position relative to said mounting bolt established by the amount of movement of said second friction ring on said mounting bolt, the retractive clearance of said second brake pad assembly relative to the disc being established by the predetermined limited axial movement of said second friction ring in said recess;

the required amounts of the predetermined limited axial movements of said friction rings in said recesses being cooperatively established to assure that said piston is sufficiently retracted to have the brake pad assembly mounted thereon positioned to be disengaged from the brake disc upon brake deactuation and the brake pad assembly mounted on said caliper housing to be disengaged from the brake disc upon brake deactuation.

* * * * *